United States Patent

Quattromani et al.

[11] Patent Number: 5,835,949
[45] Date of Patent: Nov. 10, 1998

[54] METHOD OF IDENTIFYING AND SELF-MODIFYING CODE

[75] Inventors: Marc A. Quattromani, Allen; Raul A. Garibay, Jr.; Steven C. McMahan, both of Richardson; Mark W. Hervin, Dallas, all of Tex.

[73] Assignee: National Semiconductor Corporation, Santa Clara, Calif.

[21] Appl. No.: 831,842

[22] Filed: Apr. 2, 1997

Related U.S. Application Data

[63] Continuation of Ser. No. 364,354, Dec. 27, 1994, abandoned.

[51] Int. Cl.⁶ ............................................. G06F 9/38
[52] U.S. Cl. ........................ 711/135; 711/125; 395/392
[58] Field of Search ......................... 395/392; 711/125, 711/135

[56] References Cited

U.S. PATENT DOCUMENTS

| | | |
|---|---|---|
| 4,701,844 | 10/1987 | Thompson et al. ............... 711/119 |
| 4,713,755 | 12/1987 | Worley, Jr. et al. ............... 711/123 |
| 5,136,696 | 8/1992 | Beckwith et al. ............... 395/375 |
| 5,170,476 | 12/1992 | Laakso et al. ............... 395/467 |
| 5,249,284 | 9/1993 | Kass et al. ............... 395/468 |
| 5,423,014 | 6/1995 | Hinton et al. ............... 395/383 |
| 5,467,459 | 11/1995 | Alexander et al. ............... 395/480 |
| 5,471,598 | 11/1995 | Quattromani et al. ............... 395/449 |
| 5,535,360 | 7/1996 | Cassetti ............... 395/467 |
| 5,682,492 | 10/1997 | McFarland et al. ............... 395/390 |
| 5,692,167 | 11/1997 | Grochowski et al. ............... 395/567 |
| 5,706,466 | 1/1998 | Dockser ............... 711/125 |
| 5,721,855 | 2/1998 | Hinton et al. ............... 395/394 |
| 5,742,791 | 4/1998 | Mahalingaiah et al. ............... 395/381 |

*Primary Examiner*—William M. Treat
*Attorney, Agent, or Firm*—John L. Maxin

[57] ABSTRACT

A system and method of readily identifying and handling self-modifying variable length instructions in a pipelined processor is disclosed employing index tags associated with each stage of the execution pipeline wherein the index tags identify the cache line numbers in the instruction cache from which the instructions originate.

16 Claims, 7 Drawing Sheets

METHOD OF IDENTIFYING AND SELF-MODIFYING CODE

The present application is a file wrapper continuation of application Ser. No. 08/364,354, filed Dec. 27, 1994, now abandoned.

BACKGROUND OF THE INVENTION

1. Field of the Invention

The invention relates generally to computer systems, more particularly to microprocessor architectures which employ caches and pipelined instruction stages, and even more particularly, to a system and method of tagging instructions in an execution pipeline with an index tag to identify self-modifying code.

2. Description of Related Art

Without limiting the scope of the invention, this background information is provided in the context of a specific problem to which the invention has application.

Many computer architectures permit program instructions to write to address space which is allocated for program instructions. This is commonly referred to as "self-modifying code". A classic example of self-modifying code in the x86 microprocessor architecture is a technique for handling floating point instructions. Floating point units (FPUs) a.k.a. numeric coprocessors, were at one time, cost prohibitive for general usage. Accordingly, a typical program written for the x86 microprocessor architecture assumed that the FPU was not present in a system and handled floating point instructions through software emulation by calls to subroutines. If however, the program detected a FPU through means well known in the art, the program code "self-modified" itself to increase speed so that opcodes were executed directly by the FPU rather than through emulation by the CPU.

Another exemplary, but not exclusive, illustration of self-modifying code in the x86 architecture is programming which employs software interrupts with modifiable immediate operands. For example, the immediate operand "5" in the software interrupt instruction (INT #5) could be modified to "3" based on some program condition so that an interrupt routine 3 rather than 5 is executed.

By way of further background, caching and pipelining techniques are complicated by self-modifying code since the self modifications must be propagated through the caches and the execution pipeline in the event that the code to be modified resides therein. More specifically, all levels of cache must be checked to see if any hold the instruction which is to be modified and accordingly, must be modified. Similarly, the execution pipeline must be checked for an "instruction to be modified" match which is queued deeper in the pipeline than the modifying code, and if a match occurs, must be modified accordingly.

The complications of self-modifying code are even further exacerbated by variable length instruction set microprocessors since instruction opcodes can cross cache line and page boundaries.

Yet another obstacle with self-modifying code is virtual memory addressing. The physical address rather than the virtual or "linear" address of the instruction which is to be modified, must be compared to the physical addresses of all instructions queued deeper in the execution pipeline as well as to ones in the instruction cache.

An even further complication of self-modifying code is sharing memory resources such as in a multiprocessor environment. Specifically, external processors or DMA controllers perform "snoops" on local caches to identify overlapping physical addresses. Accordingly, these physical addresses must be tagged and compared for each entry in the caches and potentially for each entry in the execution pipeline.

Heretofore, techniques which have addressed self-modifying code in pipelined/cached processor designs have employed a content addressable memory (CAM) to store and compare the linear and physical address tags of each instruction queued in the execution pipeline or stored in the instruction cache. Each cell in the CAM therefore, requires a lengthy comparator, a lengthy linear address tag, and a lengthy physical address tag, requiring more die area and taking up valuable space on an integrated circuit, forcing the designer to make tradeoffs between the depth of the execution pipeline and the number of CAMs. Moreover, the CAMs in the execution pipeline are some what duplicative with CAMs already in the instruction cache, consuming more power and compounding power dissipation problems within the integrated circuit.

It can be seen from the foregoing that there is a need for a technique of identifying and handling self-modifying code in the execution pipeline(s) without the need to compare the full linear and physical address of each instruction in every pipe stage.

SUMMARY OF THE INVENTION

To overcome the limitations in the prior art described above, and to overcome other limitations that will become apparent upon reading and understanding the present specification, the present invention discloses a system and method of tagging instructions with an index tag as each instruction enters the execution pipeline(s) of a pipelined processor so that each instruction can be readily identified in the event of self-modifying code. The index tag reflects the line number origin(s) in an instruction cache for the instruction traveling through the execution pipeline. The index tag signals replacement logic in the instruction cache not to replace any cache line that holds instruction data which is currently active in the execution pipeline. If an instruction write is identified to a location in the instruction cache, pipeline control logic flushes the execution pipeline(s) from that location and back, and instruction data is refetched from a higher order cache or main memory and re-executed.

On external and higher order cache replacement snoop hits, the pipeline control logic preferably does not flush the execution pipeline(s) but rather, the cache line which hit is marked as read invalid.

A feature of the present invention is utilization of a small index tag rather than the full physical and linear addresses to indicate the instruction cache origin(s) for each instruction in a multiple-stage execution pipeline processor.

Another feature of the present invention is the use of separate Valid and Read Valid bits to accommodate non-cacheable instruction data, and external and higher order cache replacement snoops without flushing the execution pipeline(s).

Another feature of the present invention is accommodation of variable length instruction sets with the use of logical OR circuitry to OR multiple (cache line origin) index tags which describe a single instruction.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the present invention.

BRIEF DESCRIPTION OF THE DRAWINGS

Referring now to the drawings in which like reference numerals and letters indicate corresponding elements throughout the several views:

FIG. 2 illustrates a block diagram of an exemplary computer system utilizing the microprocessor depicted in FIG. 1a;

FIG. 4 illustrates a block diagram of the instruction fetch flow for the exemplary microprocessor depicted in FIG. 1a;

FIG. 5 illustrates the instruction cache for the exemplary microprocessor depicted in FIG. 1a in more detail; and, FIG. 6 illustrates virtual address mapping to the instruction cache along with instruction cache indexing for the exemplary microprocessor depicted in FIG. 1a.

DETAILED DESCRIPTION OF THE PREFERRED EMBODIMENT(S)

In the following description of the preferred embodiment(s), reference is made to the accompanying drawings which form a part hereof, and in which is shown by way of illustration specific embodiment(s) in which the invention may be practiced. It is to be understood that other embodiments may be utilized and structural changes may be made without departing from the scope of the present invention. Throughout the following detailed description, the terms "execution pipeline" and "instruction pipeline" are used interchangeably to describe a pipelined processor having multiple stages for processing instructions. The terms "instruction cache", "instruction line cache", "instruction line buffer", and "ILB" are also used interchangeably throughout the following detailed description.

The detailed description of an exemplary embodiment of the microprocessor which employs systems and methods for detecting self-modifying code is organized as follows:
1. Exemplary Processor System
   1.1 Microprocessor
   1.2 System
2. Generalized Pipeline Flow
3. Instruction Fetch Flow
4. ILB Tag Module
5. Instruction (L0) Cache
   5.1. Non-cacheable Instructions/Linear Address Directory
6. Virtual Memory/Instruction Cache Map
7. Conclusion This organizational outline, and the corresponding headings, are used in this Detailed Description for convenience of reference only. Detailed descriptions of conventional or known aspects of microprocessor systems are omitted so as to not obscure the description of the invention with unnecessary detail. In particular, certain terminology related to the x86 computer architecture (such as register names, signal nomenclature, etc.) is known to practitioners in the field of microprocessor design.

1. Exemplary Processor System

Figure 1A:
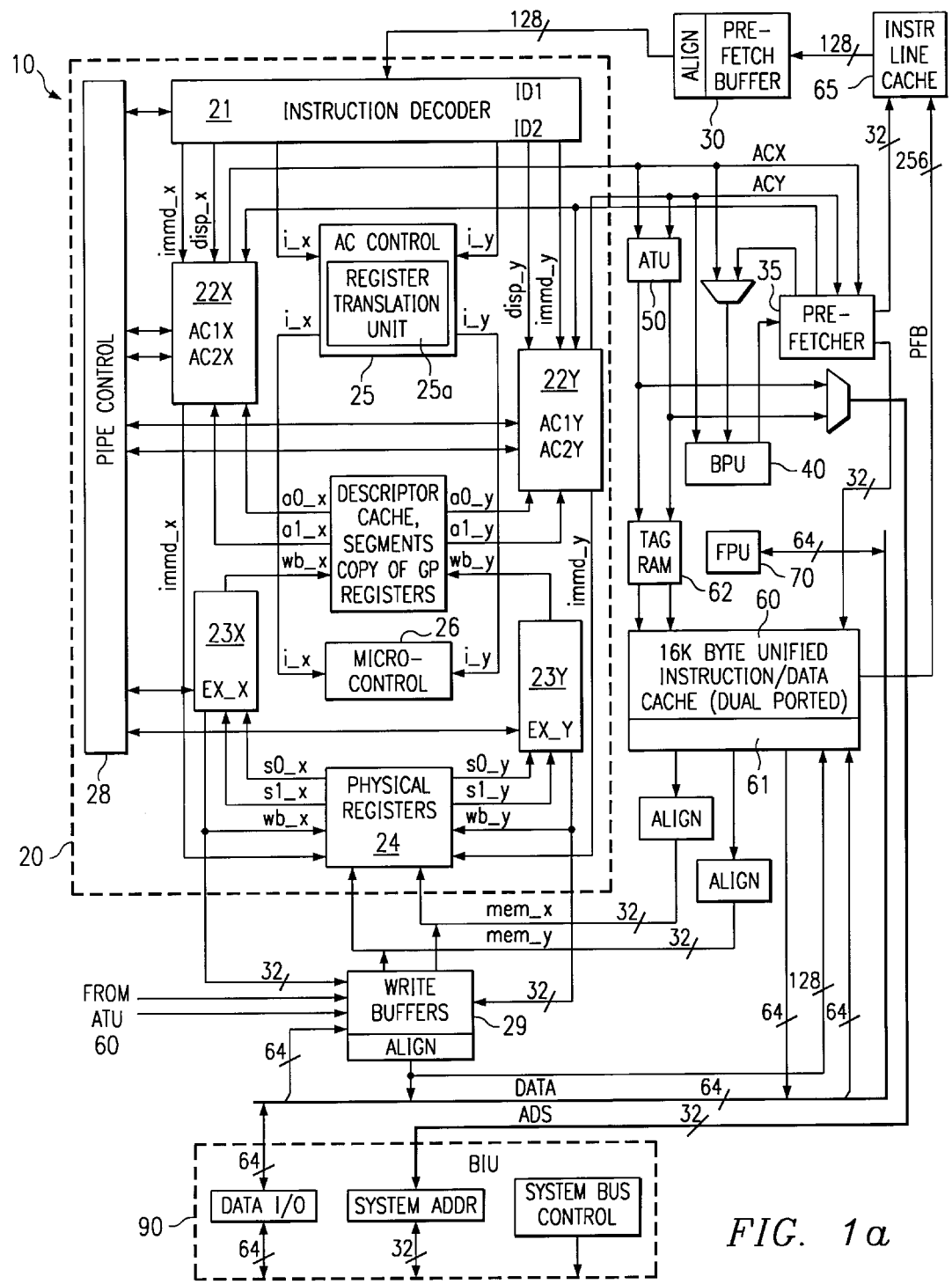
FIG. 1a illustrates a block diagram of an exemplary microprocessor practiced in accordance with the principles of the present invention.
Figure 1B:
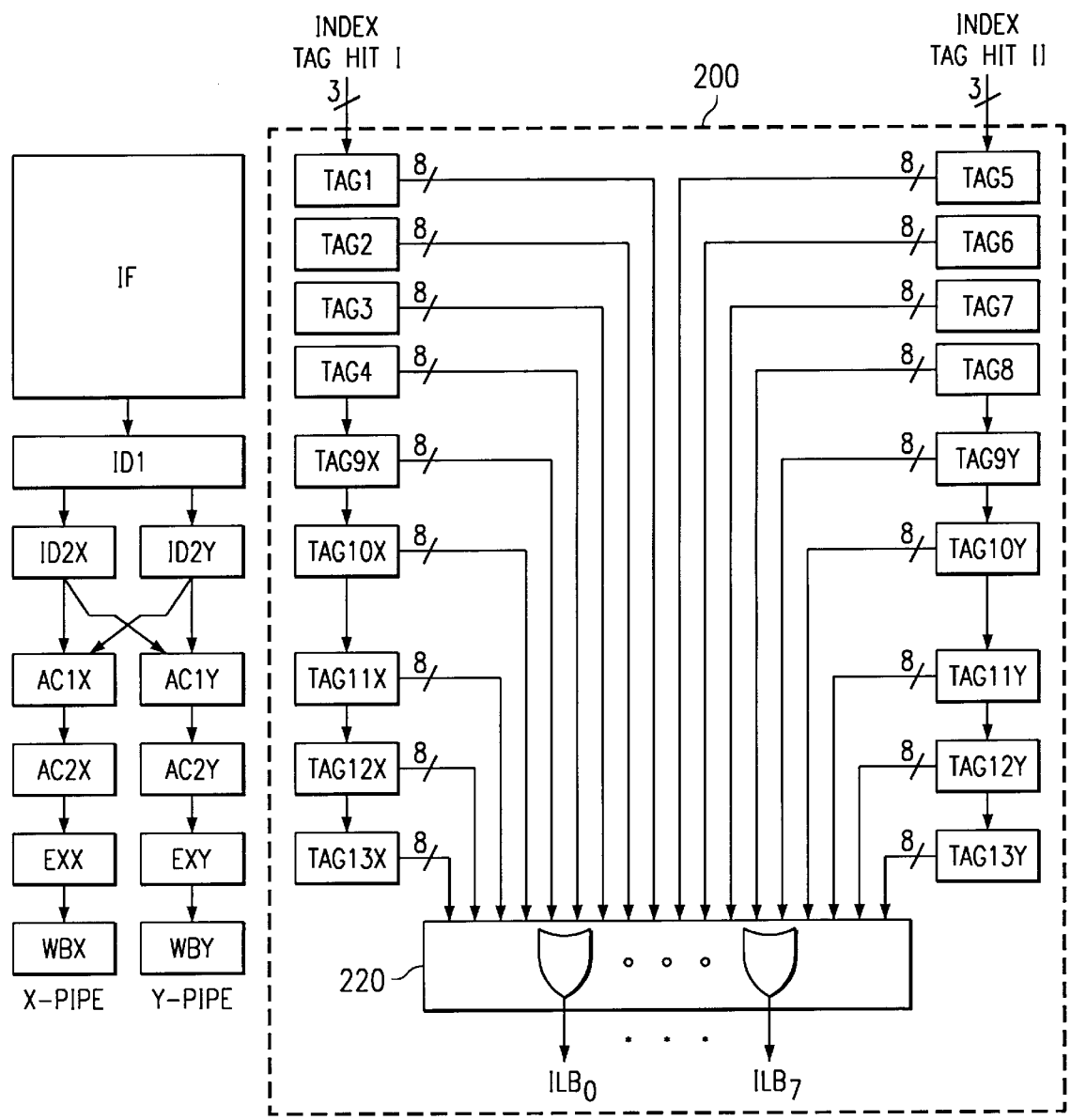
FIG. 1b illustrates in more detail, a block diagram of the instruction pipelines for the microprocessor in FIG. 1a, employing index tags practiced in accordance with the principles of the present invention.
Figure 2:
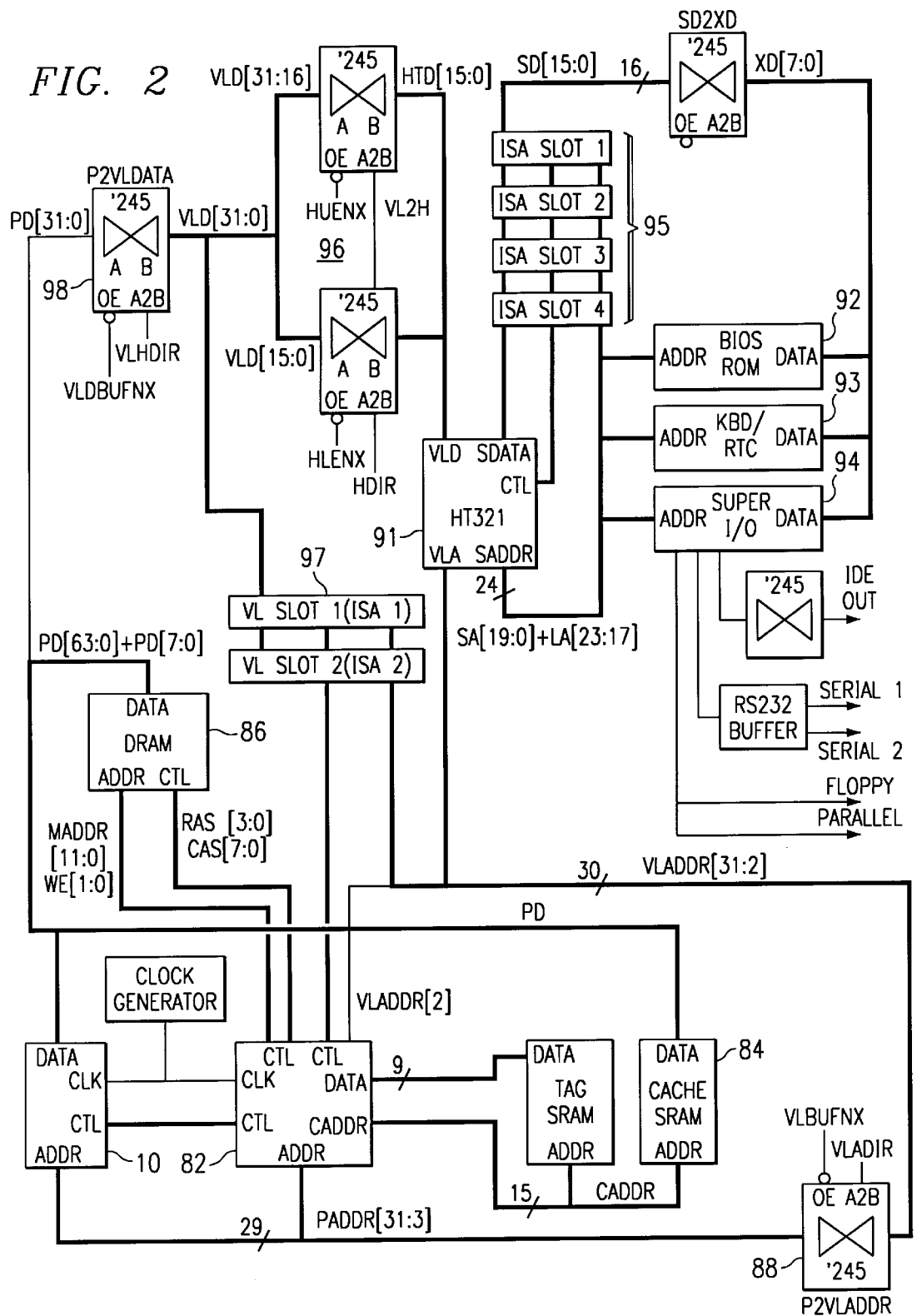

The exemplary processor system is shown in FIGS. 1a and 1b, and FIG. 2. FIGS. 1a and 1b respectively illustrate the basic functional blocks of an exemplary super-scalar, super-pipelined microprocessor along with the pipe stages of two execution pipelines (X and Y), practiced in accordance with the principles of the present invention. FIG. 2 illustrates an exemplary processor system (motherboard) design using the microprocessor.

1.1. Microprocessor

Referring to FIG. 1a, the major sub-blocks of a microprocessor 10 include: a CPU core 20, prefetch buffer 30, prefetcher 35, branch processing unit (BPU) 40, address translation unit (ATU) 50, and a sixteen Kilobyte code/data unified cache 60, including TAG RAM 62. A two hundred fifty six byte instruction cache 65 provides a primary instruction cache to reduce instruction fetches to the unified cache 60, which operates as a secondary instruction cache. An onboard floating point unit (FPU) 70 executes floating point instructions issued to it by the CPU core 20.

The microprocessor 10 uses internal thirty-two bit address and sixty-four bit data buses ADS and DATA, respectively. A two hundred fifty six bit (thirty-two byte) prefetch bus PFB, corresponding to the thirty-two, thirty-two byte line size of the unified cache 60 and the instruction cache 65, allows a full line of thirty-two instruction bytes to be transferred to the instruction cache 65 in a single clock. External interface to the ADS and DATA buses is through a bus interface unit (BIU) 90.

The unified cache 60 is four-way set associative (with a four Kilobyte set size), using a pseudo-LRU replacement algorithm, with write-through and write-back modes. It is dual ported (through banking) to permit two memory accesses (data read, instruction fetch, or data write) per clock. The instruction cache 65 is a fully associative, lookaside implementation (relative to the unified cache 60), using an LRU replacement algorithm.

The FPU 70 includes a load/store stage with four-deep load and store queues, a conversion stage (thirty-two bit to eighty bit extended format), and an execution stage. Loads are controlled by the CPU core 20, and cacheable stores are directed through the write buffers 29 (i.e., a write buffer is allocated for each floating point store operation).

The CPU core 20 is a super-scalar design with two execution pipelines X and Y. It includes an instruction decoder 21, address calculation units 22X and 22Y, execution units 23X and 23Y, and a register file 24 with thirty-two, thirty-two bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve, thirty-two bit write buffers 29—write buffer allocation is performed by the AC control unit 25. These write buffers provide an interface for writes to the unified cache 60—non-cacheable writes go directly from the write buffers 29 to external memory. The write buffer logic supports optional read sourcing and write gathering.

A pipe control unit 28 controls instruction flow through the execution X and Y pipes, including keeping the instructions in order until it is determined that an instruction will not cause an exception, squashing bubbles in the instruction stream, and flushing the execution pipelines behind branches that are mispredicted and instructions that cause an exception. For each stage, the pipe control unit 28 keeps track of which execution pipeline contains the earliest instruction, and provides a stall output and receives a delay input.

Referring to FIG. 1b, the microprocessor 10 has seven-stage X and Y execution pipelines namely: instruction fetch (IF), two instruction decode stages (ID1, ID2), two address calculation stages (AC1 and AC2), execution (EX), and write-back (WB). Note that the complex instruction decode ID and address calculation AC pipe stages are super-pipelined.

The IF stage provides a continuous code stream into the CPU core 20. The prefetcher 35 fetches sixteen bytes of instruction data into the prefetch buffer 30 from either the (primary) instruction cache 65 or the (secondary) unified cache 60. BPU 40 is accessed with the prefetch address, and supplies target addresses to the prefetcher 35 for predicted changes of flow, allowing the prefetcher 35 to shift to a new code stream in one clock.

The ID1 and ID2 decode stages decode the variable length x86 instruction set. The instruction decoder 21 retrieves sixteen bytes of instruction data from the prefetch buffer 30 each clock. In ID1, the length of two instructions is decoded (one each for the X and Y execution pipelines) to obtain the X and Y instruction pointers—a corresponding X and Y bytes-used signal is sent back to the prefetch buffer 30 (which then increments for the next sixteen byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2x to AC1y, and from ID2y to AC1x. In the exemplary embodiment, certain instructions are issued only into the X pipeline, namely: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The AC1 and AC2 address calculation stages calculate addresses for memory references and supply memory operands. The AC1 stage calculates two thirty-two bit linear (three operand) addresses per clock (four operand addresses, which are relatively infrequent, take two clocks). During this pipe stage, data dependencies are also checked and resolved using the register translation unit 25a (register scoreboard and register renaming hardware)—the thirty-two physical registers in the register file 24 are used to map the eight general purpose programmer visible logical registers defined in the x86 architecture (EAX, EBX, ECX, EDX, EDI, ESI, EBP, ESP). During the AC2 stage, the register file 24 and the unified cache 60 are accessed with the physical address (for cache hits, cache access time for the dual ported unified cache is the same as that of a register, effectively extending the register set)—the physical address is either the linear address, or if address translation is enabled, a translated address generated by an ATU 50.

Translated addresses are generated by the ATU 50 from the linear address using information from page tables in memory and workspace control registers on chip. The unified cache 60 is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipelines, handling exceptions in order is ensured.

The execution stages EXx and EXy perform the operations defined by the instruction. Instructions spend a variable number of clocks in EX, i.e., they are allowed to execute out of order (out of order completion). Both EX stages include adder, logical, and shifter functional units, and in addition, the EXx stage contains multiply/divide hardware.

The WB write back stage updates the register file 24, condition codes, and other parts of the machine state with the results of the previously executed instruction.

The microprocessor 10 supports speculative execution in the case of both branch and floating point instructions. That is, instructions following either a floating point instruction, or a branch for which the BPU 40 has predicted the direction (taken or not taken), are speculatively allowed to proceed in the execution pipelines and complete execution. If a floating point instruction faults (which may be tens or even hundreds of clocks after being issued to the FPU 70) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum four), and (b) a write or floating point store will not complete to the cache or external memory until the associated branch or floating point instruction has been resolved (i.e., the prediction is correct, or floating point instruction does not fault).

1.2. System

Referring to FIG. 2 for the exemplary embodiment, microprocessor 10 is used in a processor system that includes a single chip memory and bus controller 82. The memory/bus controller 82 provides the interface between the microprocessor 10 and the external memory subsystem—level two cache 84 and main memory 86—controlling data movement over the sixty-four bit processor data bus PD (the data path is external to the controller which reduces its pin count and cost).

Controller 82 interfaces directly to the thirty-two bit address bus PADDR, and includes a one bit wide data port (not shown) for reading and writing registers within the controller. A bidirectional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a thirty-two bit VL bus and a sixteen bit ISA bus. The ISA bus interfaces to BIOS 92, keyboard controller 93, and I/O chip 94, as well as standard ISA slots 95. The interface chip 91 interfaces to the thirty-two bit VL bus through a bi-directional thirty-two/sixteen multiplexer 96 formed by dual high/low word [31:16]/[15:0] isolation buffers. The VL bus interfaces to standard VL slots 97, and through a bi-directional isolation buffer 98 to the low double word [31:0] of the sixty-four bit processor data bus.

2. Generalized Pipeline Flow

Figure 3:
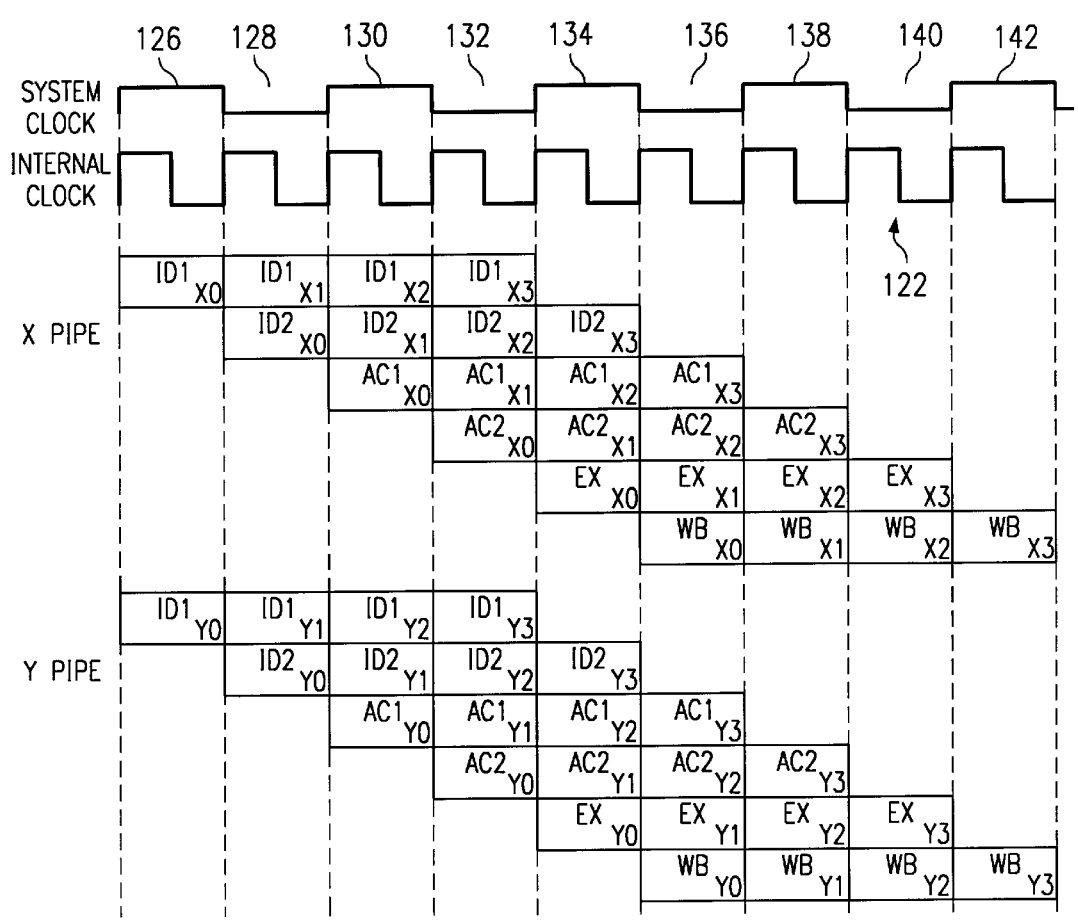
FIG. 3 illustrates the flow of eight instructions through a dual pipeline processor practiced in accordance with the principles of the present invention.

FIG. 3 illustrates the flow of eight instructions through the pipeline, showing the overlapping execution of the instructions, for a two pipeline architecture. Additional pipelines and additional stages for each pipeline could also be provided without departing from the scope of the present invention. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture—the number of instructions completed per clock is increased, without reducing the execution time of an individual instruction. Consequently a greater instruction throughput is achieved without requiring greater demands on the speed of the hardware.

The instruction flow shown in FIG. 3 is the optimum case. As shown, no stage requires more than one clock cycle. In an actual machine, however, one or more stages may require additional clock cycles to complete thereby changing the flow of instructions through the other pipe stages.

Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the EX stage to delay until the data was retrieved from main memory. For a particular stage, other stages of the pipeline may be using a needed resource, such as a multiplier, which is only in one of the execution stages in the illustrated embodiment In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle in the EX pipe stage to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control unit 28 receives "delay" signals from the various units comprising the X and Y pipes, and issues "stall" signals to the various units.

Although a single pipe control 28 unit is used for both X and Y pipelines, the pipelines themselves are controlled independent of one another. In other words, a stall in the X pipeline does not necessarily cause a stall in the Y pipeline.

3. Instruction Fetch Flow

Figure 4:
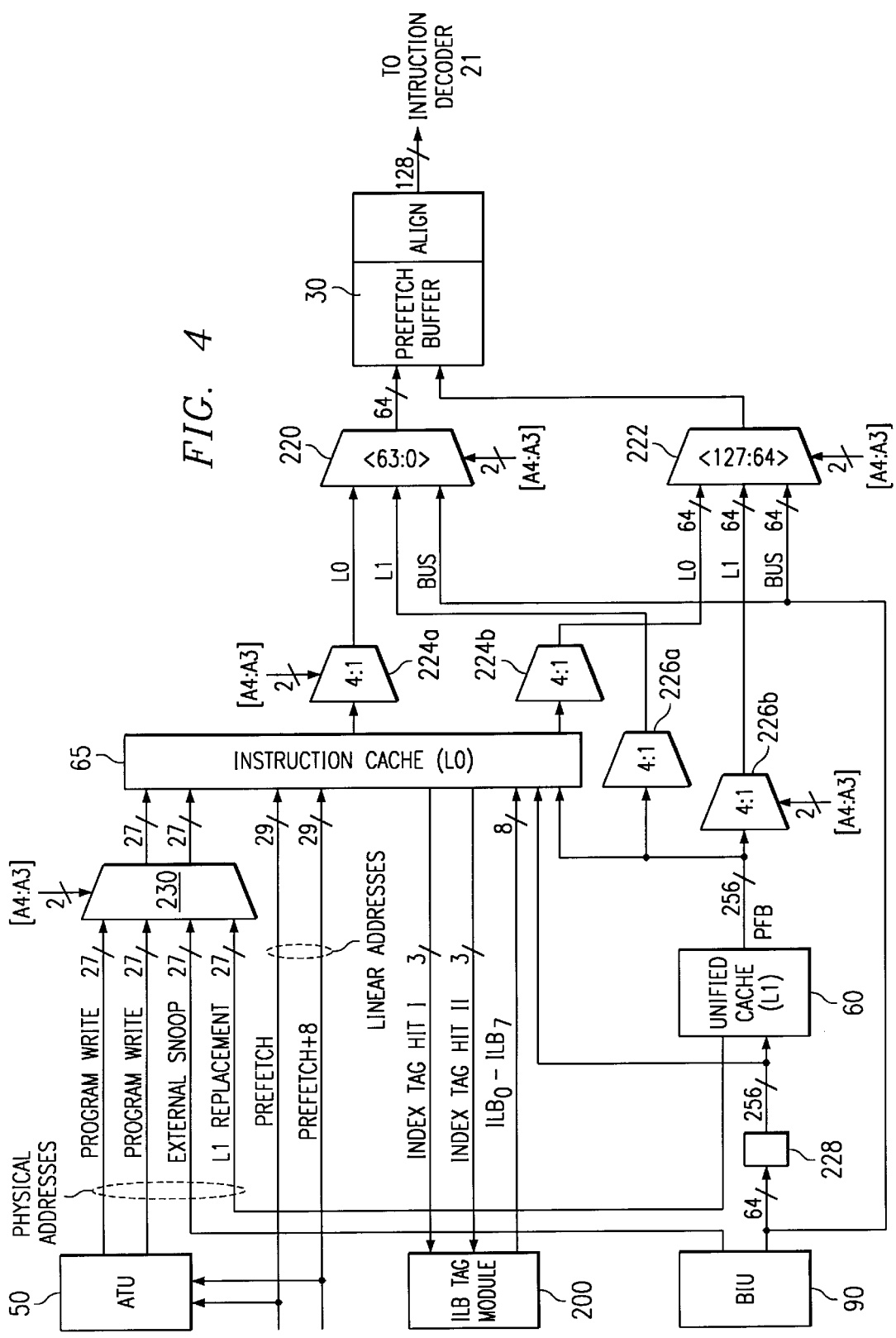

Reference is now made to FIG. 4 which depicts a more detailed diagram of the instruction fetch flow in the present invention. The prefetch buffer 30 receives a lower quad-word (bits <63:0>) from multiplexer 220 and an upper quad-word (bits <127:64>) from multiplexer 222. Multiplexers 220 and 222 have inputs coupled to either the instruction cache 65 (a.k.a. L0), the unified cache 60 (a.k.a. L1), or to external memory through the bus interface unit (BIU) 90. Since the instruction cache 65 is organized thirty two bytes (256 bits) wide, multiplexer 224a–224b reduces the cache line down to sixty-four-bit chunks for multiplexers 220 and 222, one-hundred-twenty-eight bits at a time. Similarly, multiplexer 226a–226b reduces the cache line down from the unified cache 60 to sixty-four-bit chunks for multiplexers 220 and 222. The third set of inputs to multiplexers 220 and 222 originate from the BIU 90 which supplies instruction data from external memory.

The instruction cache 65 receives two physical addresses from multiplexer 230. Multiplexer 230 has physical address inputs from the ATU 50 (program writes), the BIU 90 (external snoops), and from the unified cache 60 (L1 Replacements). The instruction cache 65 receives linear or "virtual" addresses from the prefetcher 35 (FIG. 1a). The BIU 90 supplies via concentrator 228, two-hundred-fifty-six bit wide instruction data to the instruction cache 65. Likewise, the unified cache 60 supplies two-hundred-fifty-six bit wide instruction data directly to the instruction cache 65 over the PFB bus.

An ILB tag module 200 supplies eight ($ILB_0$–$ILB_7$) hit signals to the instruction cache 65. It should be understood that the eight hit signals ($ILB_0$–$ILB_7$) correspond to the number of lines in the instruction cache 65 and it is contemplated that the number of hit signals can be expanded or contracted to accommodate other size instruction caches. It should also be understood that while the ILB tag module 200 is depicted as a single functioning module, it does not necessarily represent the structural arrangement of the exemplary system. Rather, it is primarily intended to illustrate the major components in a convenient functional grouping wherein the present invention may be more readily understood.

4. ILB Tag Module

The ILB tag module 200 is best described with reference again to the block diagram in FIG. 1b. The seven-stage X and Y execution pipelines are shadowed by index tag registers TAG1–TAG13 in the ILB tag module 200 which hold the line number origin(s) in the instruction cache 65 of instruction data traveling down the instruction pipeline. Index tag registers TAG1–TAG13 include a 3-to-8 decoder (not shown) to expand the line number of instruction cache 65 to one-of-eight hit signals. Tags TAG9–TAG13 further include logical OR circuitry (not shown) to logically OR together multiple one-of-eight hits signals to identify that more than one line in the instruction cache 65 is associated with a particular instruction in a pipe stage, described in more detail hereinbelow.

Each time the prefetcher 35 fetches instruction data into the prefetch buffer 30 (FIG. 1a), two index tags from the instruction cache 65 indicating the line hit (described in more detail hereinbelow) are loaded into the IF stage to identify the origin of the instruction data in the instruction cache 65. If the instruction data originates from the unified cache 60 (L1) or from main memory via BIU 90, it is also concurrently stored in the instruction cache 65 and assigned an index tag corresponding to its instruction cache line number.

In the preferred embodiment, the instruction cache 65 is eight lines deep by thirty-two bytes (256 bits) wide. Accordingly, a three bit index tag can uniquely identify each of the eight lines in the instruction cache 65. The instruction fetch (IF) stage preferably has eight tags (TAG1–TAG8) associated with it since it can hold eight instruction fetches. The ID1 and ID2 instruction decode stages, the AC1 and AC2 address calculation stages, and the EX execution stage, each have two index tags, one for each X and Y pipeline, although each tag may represent more than one cache line as described in more detail hereinbelow. It is to be understood that the index tags can be extended or contracted (in length and in quantity) to fit other pipeline stage sizes and other instruction cache sizes without departing from the scope of the present invention.

Each of the eight bits in each index tag are logically OR'ed together by logical OR array 202. The logical OR array 202 has eight sets of eighteen inputs and provides eight hit outputs ($ILB_0$–$ILB_7$) to indicate that a particular line in the instruction cache 65 is present somewhere in the execution pipeline. $ILB_0$–$ILB_7$ are routed to replacement logic 232 in the instruction cache 65, depicted in FIG. 5 and described in more detail hereinbelow.

5. Instruction (L0) Cache

Figure 5:
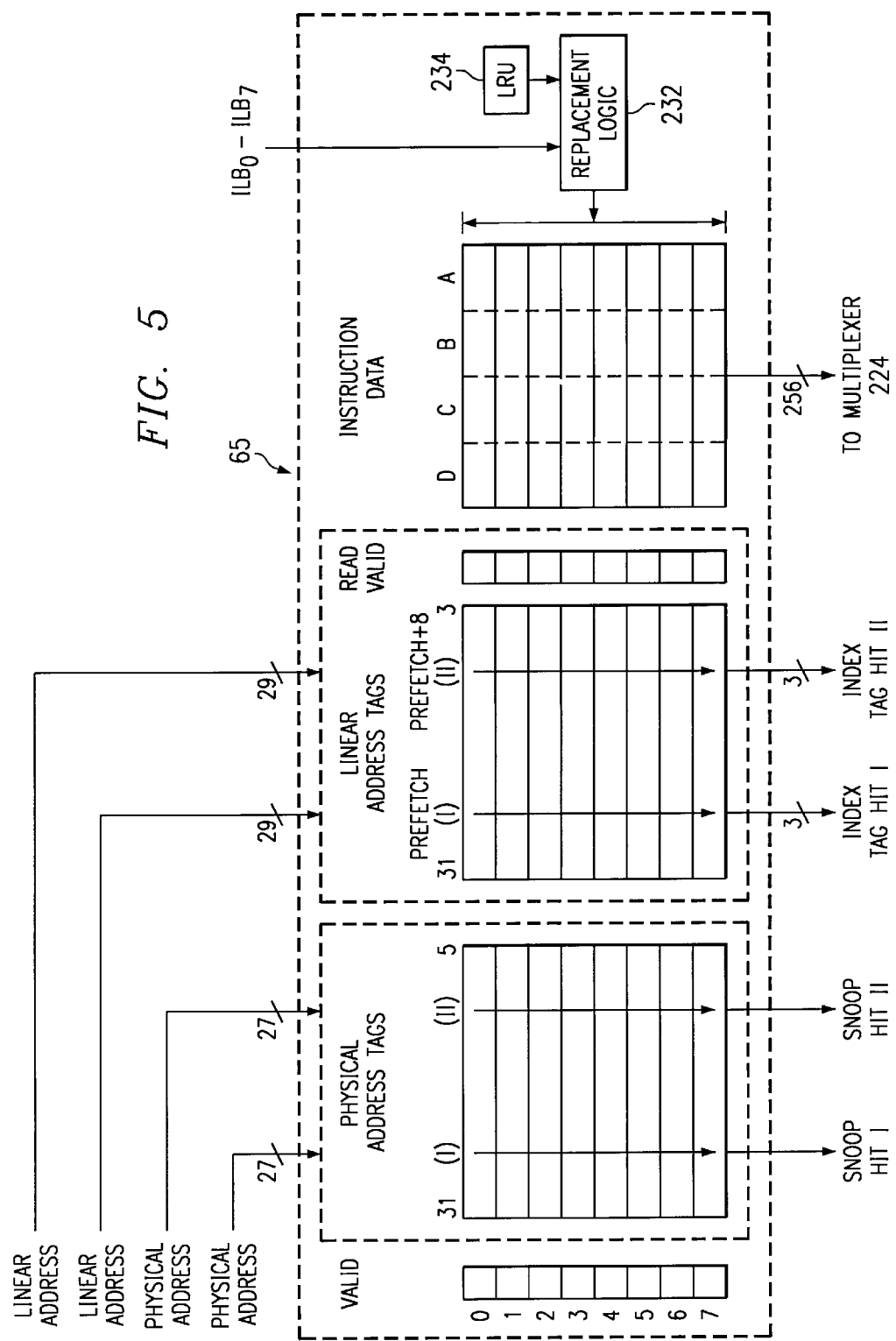

Reference is now made to FIG. 5 which depicts the instruction cache 65 in more detail. Each cache line in the instruction cache 65 preferably includes two copies of the same physical address (tags I and II), two copies of the same linear address (tag I—Prefetch) and (tag II—Prefetch+8), a Valid bit, a Read Valid bit, thirty-two bytes of instruction data, three-bit—index tag Hit I and index tag Hit II signals, and Snoop Hit I and Snoop Hit II signals. It should be understood that index tag Hit I and index tag Hit II signals could be eight bits wide instead of being encoded as three bits, as described in more detail hereinbelow.

Replacement logic 232 has inputs coupled to the $ILB_0$–$ILB_7$ outputs from the ILB tag module 200 as well as to LRU circuitry 234. The replacement logic 232 generally follows some form of least recently used scheme designated by LRU 234 to evict and replace entries in the instruction cache 65 unless the $ILB_0$–$ILB_7$ signals indicate that a selected cache line is in either the X or Y execution pipeline or in the prefetch buffer 30. Accordingly, any cache line identified by $ILB_0$–$ILB_7$ as being in either execution pipeline is not replaced.

The physical address tags are compared whenever there is a program write to an instruction address, an external memory request to the microprocessor (e.g. DMA controller or an external processor in a multiple processor environment with shared memory), or a cache line replacement from the unified cache 60. The physical address is "snooped" (compared) to determine whether or not it is contained in the instruction cache 65. If a physical address of a program write is found in a line in the instruction cache 65, the Valid and Read Valid flags are both invalidated (cleared), the appropriate Hit signal is asserted, and if the cache line is propagated into the execution pipeline, the respective execution pipeline is flushed.

If however, a snoop hit results from an external snoop or a replacement snoop from the unified cache 60, only the Read Valid flag is invalidated (cleared) and the execution pipelines are not flushed. The pipeline flushes are preferably invoked through an exception handler rendered through microcode. Moreover in the preferred embodiment, the X and Y pipelines are only flushed from the stages preceding the stage that contain the hit.

After the execution pipelines are flushed and the line in the instruction cache 65 is invalidated, the prefetcher 35 refetches the modified cache line(s) which will be supplied from the unified cache 60, or if necessary, from main memory. Self-modifying code thus "modifies" (writes) to the unified cache 60 or higher level cache rather than to the instruction cache 65.

The linear address tags which identify the lines in the instruction cache 65, are compared with the linear address supplied by the prefetcher (prefetch) and an address indexed by eight (prefetch+8), to determine if any instruction hits are in the instruction cache 65. Index Hit I and Hit II tags identify the line number in the instruction cache 65 that hit, if any, and are asserted if the Valid and the Read Valid bits are set (valid).

5.1. Non-cacheable Instructions/Linear Address Directory

In the event instruction data is deemed non-cacheable, prefetcher 35 does not load instruction data into/from the unified cache 60. However, a cache line in the instruction cache 65 is still allocated for the non-cacheable instruction data, the Valid bit is set, and the Read Valid bit is cleared. In this manner, subsequent requests for the non-cacheable instruction data results in a cache miss but the cache line origin (i.e. ILB tag) is still in the ILB tag module 200 and is used for comparison to identify self-modifying code.

Moreover, while the preferred embodiment has been described with respect to the instruction cache 65 functioning as an L0 (primary) cache, the present invention also has application with a large (L1) type instruction cache. In this case, the primary origin for instructions is from the L1 cache 60. Although cache 60 is depicted as being unified, it may also be a separate instruction and data cache. In the alternative embodiment, the L0 cache 65 functions as a linear address directory (i.e. similar to the function for non-cacheable instruction data) rather than an instruction cache for storing all the elements depicted in FIG. 5 with the exception of instruction data. That is, the instructions originate from a relatively large instruction cache 60 and the L0 cache 65 functions as an indirect index to cache line hits (i.e. a linear address directory 65) for providing tags to the ILB index tag module 200.

6. Virtual Memory/Cache Map

Reference is now made to Table 1 below and FIG. 6, which best exemplify how virtual memory address space is mapped into the instruction (or linear directory) cache 65 and how the ILB tags identify stages in the execution pipelines. It should be understood however, that arbitrary values for the linear address tags are used for purposes of explanation. The virtual or linear memory address space is depicted vertically along the right side in FIG. 6. In this example, program flow occurs top to bottom with arbitrary change of flow (COF) instructions occurring in address space 7e00f–7e010 and in address space 7e040–7e047. To simplify explanation, the address space along the cache line in instruction cache 65 is broken down into eight-byte wide "quadrants" designated A, B, C, and D.

Access to the instruction cache 65 is described with respect to the internal clock 122 depicted in FIG. 3. Referring specifically to Table 1, during clock cycle zero, program execution begins with a prefetch linear address of 7e000 resulting in a hit in the instruction cache 65 on line five, quadrants A and B. The three bit Hit I and Hit II index tags "tag" the instruction data located at these addresses with the instruction cache line number (binary 101). The three bit tag is decoded in the ILB tag module 200 into an eight bit tag. As the instruction travels through the X and Y pipelines, the decoded eight-bit tag propagates through the ILB tag module 200 as discussed hereinabove, identifying the instruction as originating from line five (00010000) in the instruction cache 65.

During clock cycle one, program execution continues with prefetch and prefetch+8 linear addresses 7e010 and 7e018 respectively, resulting in hits in the instruction cache 65 on line five, quadrants C and D respectively. Accordingly, Hit I and Hit II index tags "tag" the instruction data located at these addresses with the instruction cache line number.

The execution of a change of flow instruction (e.g. Jump) somewhere in address space 7e010–7e01f forces the prefetcher 35 to fetch prefetch and prefetch+8 linear addresses 7e038 and 7e040 respectively during clock cycle two. As a result, a "split line" hit occurs in the instruction cache 65 on line zero, quadrant D and line six, quadrant A. Accordingly, Hit I index tag indicates "000" and Hit II index tag indicates "110".

At this point, it should be noted that it is possible for a single (multiple-byte) instruction to cross cache line boundaries such that two ILB index tags actually describe one instruction. Typically however, the subsequent instruction will reflect the same ILB index tag as the second tag for the multiple-byte instruction unless the multiple-byte instruction is a COF type instruction. If for example, a "split line" single instruction fetch from cache lines 1 and 6 travels down the X-pipe, TAG9X–TAG 13X would reflect both cache lines by ORing both ILB tags (00000001 and 00100000) together to produce a unitary hit tag of (00100001). Thus both $ILB_1$ and $ILB_6$ would be asserted.

Figure 6:
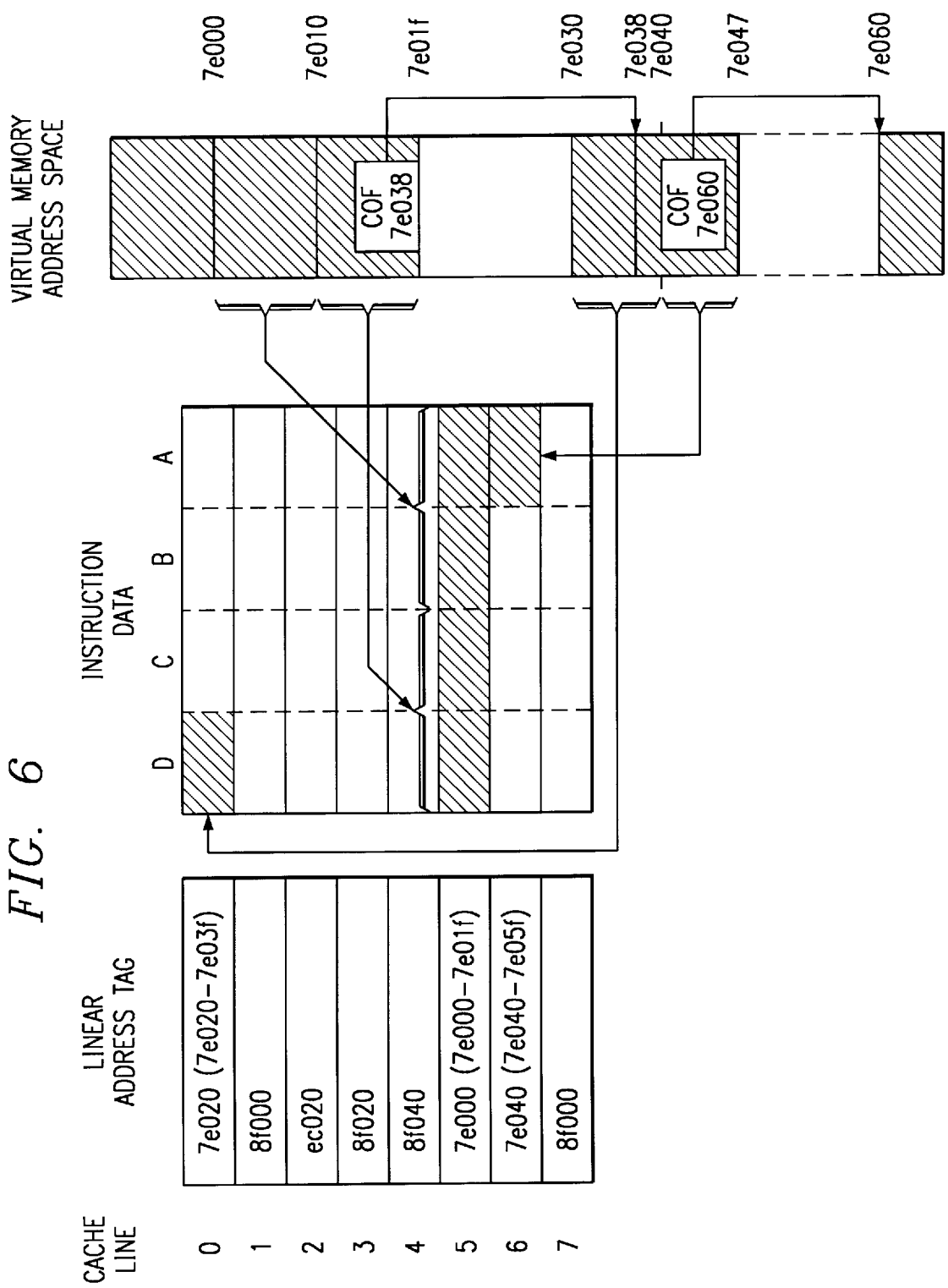

Continuing the discussion with respect to FIG. 6, the execution of a change of flow instruction (e.g. Jump) somewhere in address space 7e040–7e047 forces the prefetcher 35 to fetch prefetch 7e060 address during clock cycle 3. As a result, a miss occurs in the instruction cache 65 and instructions for this section are dispatched directly from the unified cache 60 or main memory via BIU 90. The instruction cache 65 is updated with the instruction data and the index tag identifying the instruction cache 65 line where it will be stored is propagated through the ILB Tag module 200. As discussed above, the cache line replacement is preferably performed with a LRU technique along with consideration of the $ILB_0$–$ILB_7$ hit tags.

TABLE 1

| | Address | | Quadrant | | Cache Line | | Index Tag Hit | |
|---|---|---|---|---|---|---|---|---|
| Clock | Prefetch | Prefetch + 8 | I | II | I | II | I | II |
| 0 | 7e000 | 7e008 | A | B | 5 | 5 | 101 | 101 |
| 1 | 7e010 | 7e018 | C | D | 5 | 5 | 101 | 101 |
| 2 | 7e038 | 7e040 | D | A | 0 | 6 | 000 | 110 |
| 3 | 7e060 | Instruction Cache Miss | | | | | xxx | xxx |

7. Conclusion

Although the Detailed Description of the invention has been directed to certain exemplary embodiments, various modifications of these embodiments, as well as alternative embodiments, will be suggested to those skilled in the art. For example, specific register structures, mappings, bit assignments, cache associations and sizes, and other implementation details are set forth solely for purposes of providing a detailed description of the invention. However, the invention has general applicability to any computer system architecture which permits self-modifying code. Various modifications based on trade-offs between hardware and software logic will be apparent to those skilled in the art. Also, the specific address nomenclature (linear address, effective address, segment base, relative base, etc.) is conventional for the x86 architecture, and is used for the purpose of describing the exemplary embodiment only. The invention encompasses any modifications or alternative embodiments that fall within the scope of the Claims.

What is claimed is:

1. A pipelined microprocessor that supports self-modify code comprising:

(a) at least one execution pipeline having a plurality of stages;

(b) a primary instruction cache coupled to said at least one execution pipeline and supplying instructions thereto;

(c) an index tag module, disposed adjacent to said at least one execution pipeline, having a plurality of index tags, one for each of said plurality of stages in said at least one execution pipeline, each index tag identifying at least one cache line from where an instruction originated;

(d) cache replacement logic, responsive to said plurality of index tags, to replace lines in said primary instruction cache which are not in said at least one execution pipeline; and (e) flush means, responsive to an instruction writing to an address within said primary instruction cache, for flushing said at least one execution pipeline.

2. A pipelined microprocessor as recited in claim 1 wherein said plurality of index tags further includes logical OR circuitry to identify more than one cache line from where said instruction originated.

3. A pipelined microprocessor as recited in claim 1 further comprising a secondary instruction cache disposed between said primary instruction cache and main memory.

4. A pipelined microprocessor as recited in claim 3 wherein said secondary instruction cache is a unified cache.

5. A pipelined microprocessor as recited in claim 1 wherein said primary instruction cache has a first and a second valid bit associated with each cache line, and further comprising:

(f) means for clearing both first and second valid bits for a particular line in said primary instruction cache in response to said instruction write in (e); and, (g) means for clearing said second valid bit only in response to an external snoop or replacement hit in said instruction cache.

6. A pipelined microprocessor as recited in claim 5 further comprising:

(h) means for setting said first valid bit and clearing said second valid bit in response to non-cacheable instruction data being executed in said execution pipeline.

7. A pipelined microprocessor as recited in claim 1 wherein said flush means flushes only those stages in said at least one execution pipeline preceding a stage that contains a target address of said instruction write.

8. A pipelined microprocessor that supports self-modify code comprising:

(a) pipelined execution means for executing instructions in multiple stages;

(b) cache means, having cache lines, for supplying instructions to said pipelined execution means;

(c) index tag means for supplying an index tag that identifies a cache line origin of an instruction being executed in said pipelined execution means;

(d) cache replacement logic means, responsive to said index tag means, for replacing lines in said cache means which hold instructions that are not in said pipelined execution means; and (e) flush means, responsive to a write to a target address within said cache means, for flushing said pipelined execution means.

9. A pipelined microprocessor as recited in claim 8 wherein said index tags means further includes logical OR means for identifying more than one cache line from where said instruction originated.

10. A pipelined microprocessor as recited in claim 8 wherein said cache means includes a primary cache and a secondary instruction cache wherein said primary cache is relatively small with respect to said secondary cache.

11. A pipelined microprocessor as recited in claim 10 wherein said secondary instruction cache is a unified cache.

12. A method of identifying and handling self-modifying instructions in a processor having at least one multiple-stage execution pipeline and an instruction cache, comprising steps of:

(a) fetching instructions into said at least one multiple-stage execution pipeline from at least one line in said instruction cache;

(b) tagging each instruction with an index tag to identify where each instruction originated in said instruction cache;

(c) propagating in parallel, each instruction and its index tag through said at least one execution pipeline;

(d) monitoring each index tag with cache line replacement logic;

(e) inhibiting replacement of instruction cache lines indicated by any index tag as originating from any instruction in said at least one execution pipeline; and, (f) flushing said at least one execution pipeline if an instruction write is made to said instruction cache.

13. A method as recited in claim 12 wherein step (b) further includes said step of logically ORing multiple index tags to identify where each instruction originated in said instruction cache.

14. A method as recited in claim 12 wherein said instruction cache has a first and a second valid bit associated with each cache line, and further comprising said steps of:

(g) clearing both first and second valid bits for a particular line in said instruction cache in response to said instruction write in step (f); and, (h) clearing said second valid bit only in response to an external snoop or replacement hit in said instruction cache.

15. A method as recited in claim 12 wherein step (f) flushes only those stages in said at least one execution pipeline preceding a stage that contains a target address of said instruction write.

16. A method as recited in claim 12 wherein step (a) further comprises said step of fetching instructions into said at least one execution pipeline from a higher order cache or main memory in parallel with filling said instruction cache in response to a miss in said instruction cache.

* * * * *